Figure 1:
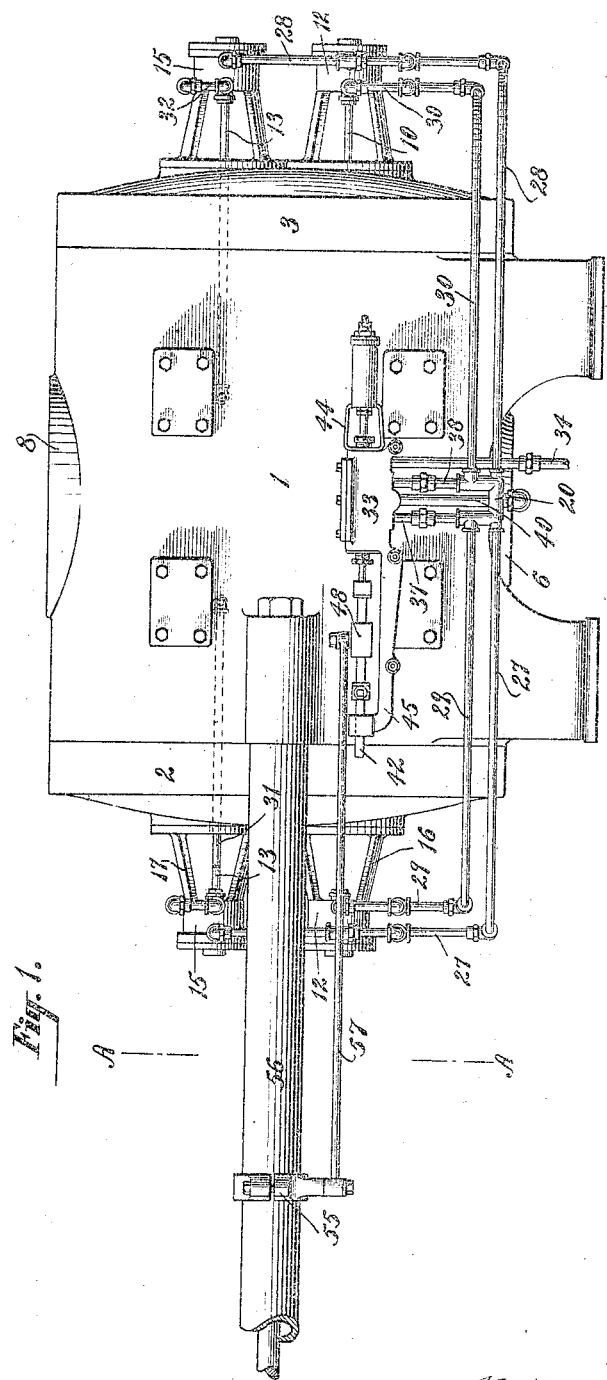

No. 898,135. PATENTED SEPT. 8, 1908.
W. PRELLWITZ.
VALVE OPERATING DEVICE FOR COMPRESSORS.
APPLICATION FILED MAR. 8, 1905.

5 SHEETS—SHEET 1.

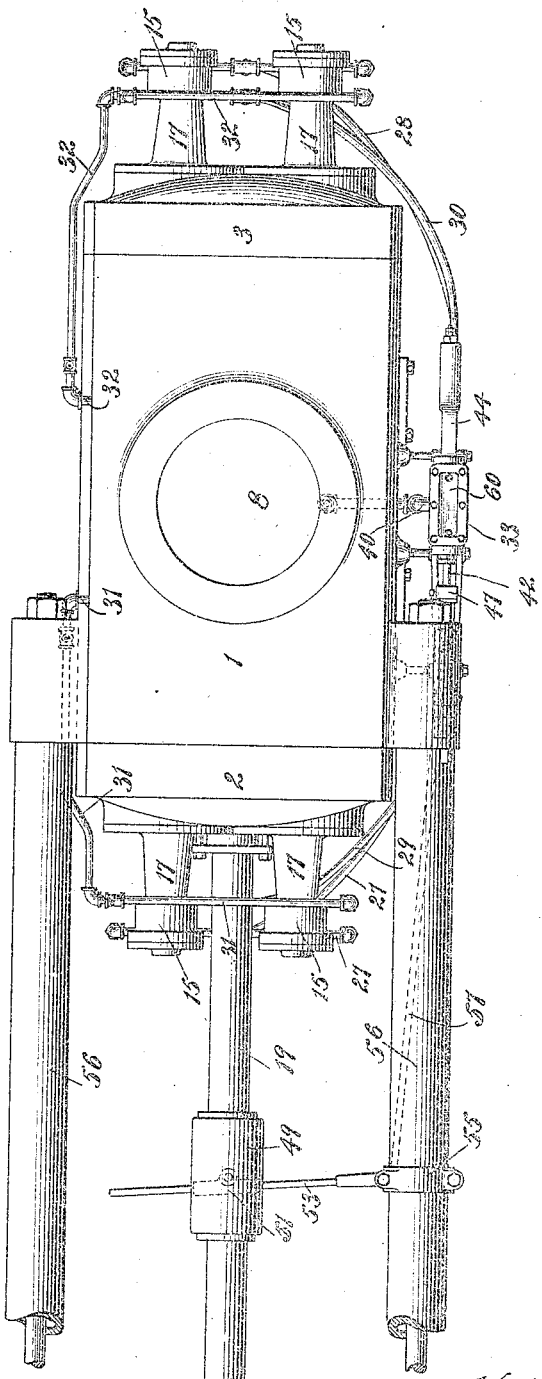

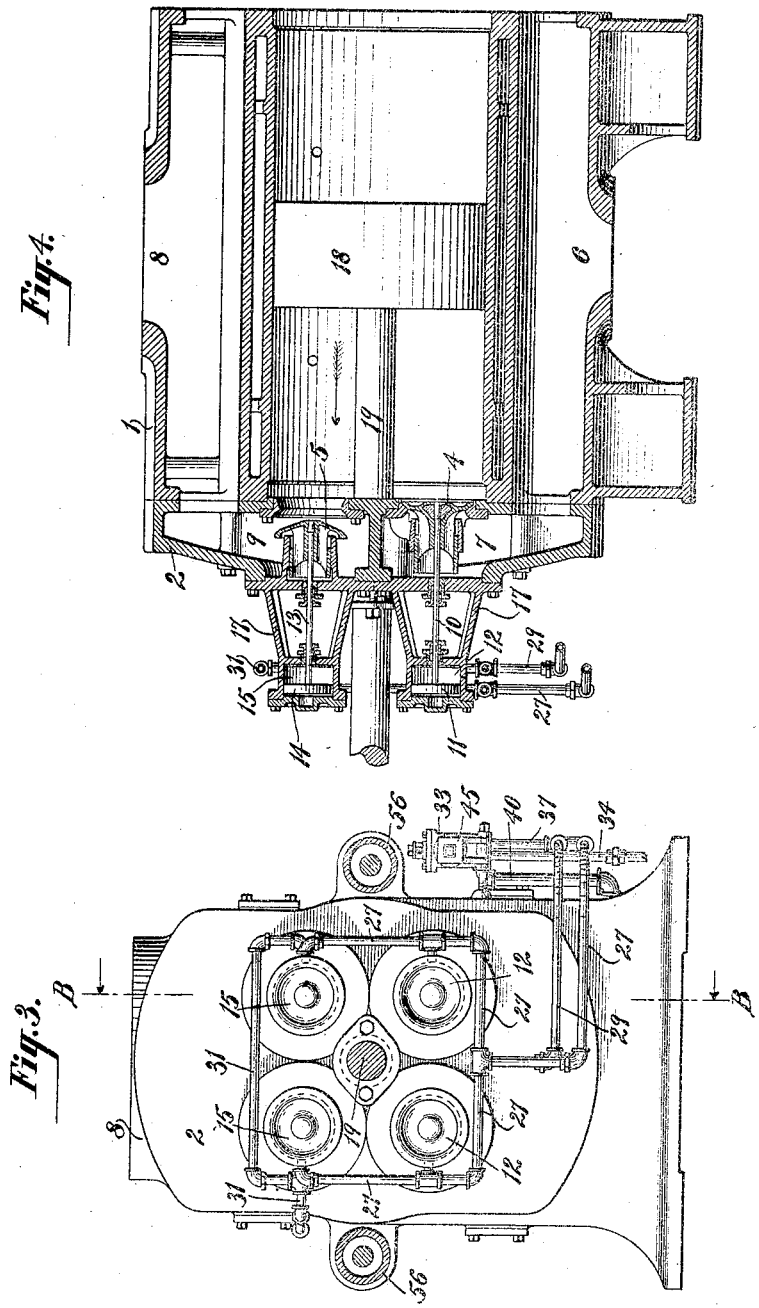

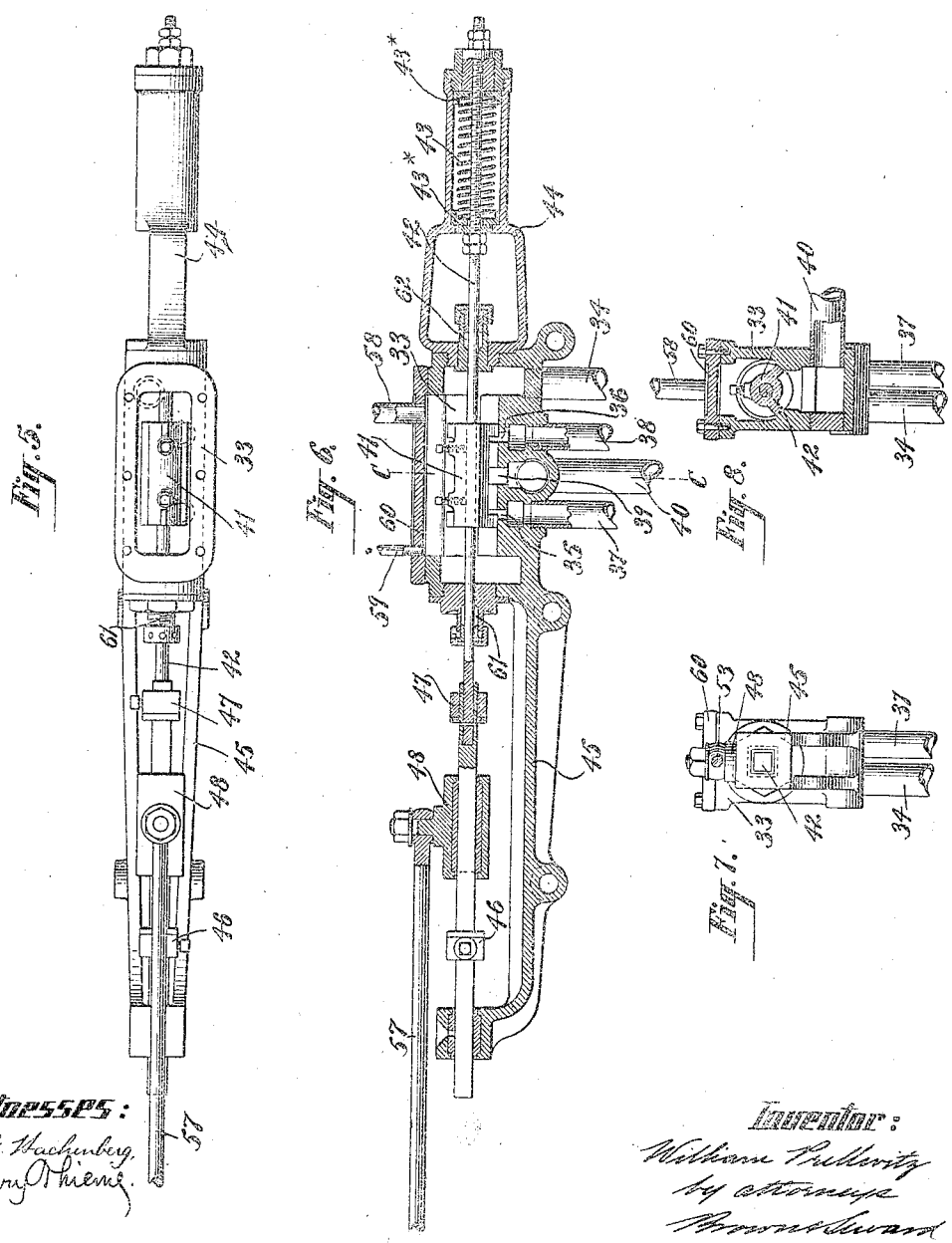

No. 898,135. PATENTED SEPT. 8, 1908.
W. PRELLWITZ.
VALVE OPERATING DEVICE FOR COMPRESSORS.
APPLICATION FILED MAR. 8, 1905.
5 SHEETS—SHEET 5.
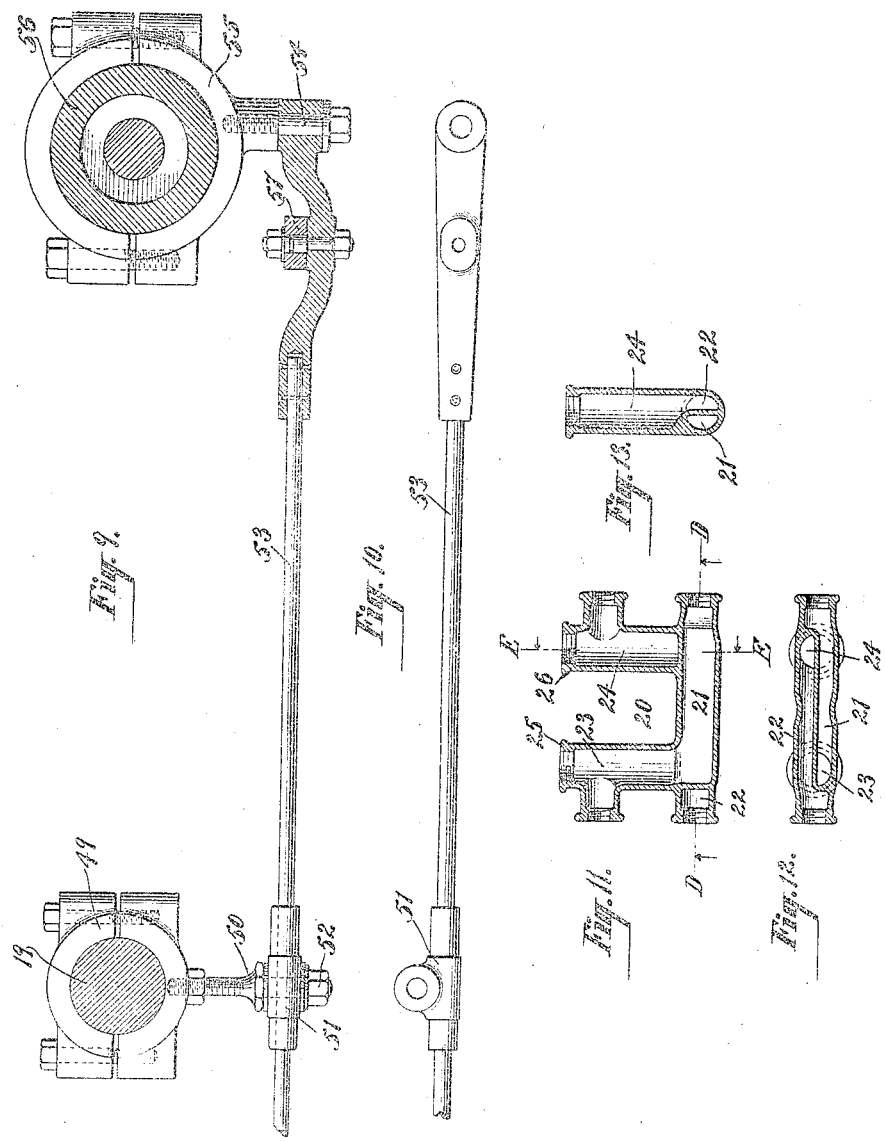

UNITED STATES PATENT OFFICE.

WILLIAM PRELLWITZ, OF EASTON, PENNSYLVANIA, ASSIGNOR TO THE INGERSOLL-SERGEANT DRILL COMPANY, OF NEW YORK, N. Y., A CORPORATION OF WEST VIRGINIA.

VALVE-OPERATING DEVICE FOR COMPRESSORS.

No. 898,135.     Specification of Letters Patent.     Patented Sept. 8, 1908.

Application filed March 8, 1905. Serial No. 249,136

*To all whom it may concern:*

Be it known that I, WILLIAM PRELLWITZ, a citizen of the United States, and resident of Easton, in the county of Northampton and State of Pennsylvania, have invented a new and useful Valve-Operating Device for Compressors, of which the following is a specification.

This invention has, for its object, to provide certain improvements in the means for operating the fluid compressor valves whereby the inlet valves are positively opened and closed by pressure from a controlling valve chest; the discharge valves positively closed by pressure from the said chest and positively opened by direct communication from the cylinder and by auxiliary means leading from the cylinder to the fluid motors for the said discharge valves.

In the accompanying drawings, Figure 1 is a view in side elevation of a horizontal compressor embodying the invention, Fig. 2 is a top plan view of the same, Fig. 3 is a transverse section taken in the plane of the line A—A of Fig. 1, Fig. 4 is a vertical longitudinal section taken in the plane of the line B—B of Fig. 3 one of the cylinder heads and the parts which it carries being removed, Fig. 5 is a detail top plan view of the fluid supply controlling valve chest, its valve and its operating mechanism, on an enlarged scale, Fig. 6 is a vertical longitudinal section through the same, Fig. 7 is an end view of the valve chest, Fig. 8 is a transverse section taken in the plane of the line C—C of Fig. 6, Fig. 9 is a detail view partly in section on an enlarged scale of a portion of the fluid supply controlling valve operating mechanism, Fig. 10 is a detail view of the valve rod operating lever, Fig. 11 is a vertical longitudinal section through the six-way fitting, Fig. 12 is an inverted section in the plane of the line D—D of Fig. 11, and Fig. 13 is a vertical cross section taken in the plane of the line E—E of Fig. 11 looking in the direction of the arrows.

The cylinder of the compressor is denoted by 1 and its heads by 2 and 3. Each of the heads is provided with one or more inlet and one or more discharge valves. In the present instance each head is shown as being provided with two inlet valves 4 and two discharge valves 5. The inlet valves 4 open and close communication to the common inlet port 6 of the compressor through inlet chambers 7, and the discharge valves 5 open and close communication to the common discharge port 8 of the compressor through the discharge chambers 9. These inlet and discharge valves have the usual seats and are guided in their movements toward and away from the seats by the usual tubular guides.

Fluid pressure motors are used in connection with the inlet and discharge valves as follows:—The stems 10 of the inlet valves 4 are each provided with a piston 11 located in a cylinder 12. The stems 13 of the discharge valves 5 are similarly provided with pistons 14 located in cylinders 15. These cylinders 12 and 15 are suitably supported on the compressor heads 2 and 3 by brackets or standards 16, 17.

The compressor piston is denoted by 18 and its rod by 19. A six-way fitting 20 is provided with a sub-divided horizontal portion forming passages 21, 22, in open communication with vertical passages 23, 24, in branches 25, 26, respectively, of the six-way fitting. The horizontal passage 22 in the six-way fitting is connected through main and branch pipes 27 with the motor cylinders 12 and 15 of the compressor head 2 in front of the motor pistons 11 and 14 of both the inlet and discharge valves. The horizontal passage 21 in the six-way fitting 20 is similarly connected through main and branch pipes 28 with the motor cylinders 12 and 15 of the compressor head 3 in front of the motor pistons 11 and 14 of both the inlet and discharge valves. The vertical passage 23 of the six-way fitting is connected through main and branch pipes 29 with the motor cylinders 12 of the inlet valves 4 in the compressor head 2 back of the pistons 11. The vertical passage 24 of the six-way fitting is similarly connected through main and branch pipes 30 with the motor cylinders 11 of the inlet valves in the compressor head 3 back of the inlet valve pistons.

The interior of the compressor piston chamber is connected through a main and branch pipes 31 with the motor cylinder 15 of the discharge valves 5 in the compressor head 2 back of the pistons 14. The interior of the compressor piston chamber is similarly connected through main and branch pipes 32 with the motor cylinders of the discharge valves in the compressor head 3 back of the pistons. The openings of these pipes 31 and 32 into the compressor piston chamber are spaced a sufficient distance from the ends of the said chamber to permit the compressor piston 18 to alternately open the said pipes to the space in front and back of the said piston.

The means which I have shown for supplying pressure to the valve motor cylinders is constructed, arranged and operated as follows:—A fluid supply controlling valve chest 33 is located at the side of the compressor cylinder, which chest is at all times in open communication through a pipe 34 with a source of fluid pressure supply such, for instance, as the receiver or cooler. This chest 33 is provided with two ports 35, 36, which are in open communication with the vertical passages 23, 24, of the six-way fitting 20 through pipes 37, 38, respectively. An intermediate port 39 leads to an outlet pipe 40 which outlet pipe may be directed into the main inlet port 6 of the compressor. An ordinary three port slide valve 41 is located in the chest 33 in position to alternately open the pipes 37, 38, to the interior of the chest and to the outlet pipe 40. This valve 41 is represented in the accompanying drawings in its intermediate position. The slide valve 41 is provided with a rod 42 which extends through the opposite ends of the chest 33. A double acting spring 43 is mounted on a bracket 44 projecting from one end of the chest, which spring exerts force in a direction tending to return the slide valve 41 into an intermediate position after it has been moved to the limit of its movement in either direction. This is accomplished by the double shoulder connection 43*.

The slide valve rod 42 upon the opposite side of the valve from the spring 43 is mounted in a suitable bracket 45 projecting from the end of the chest 33 and the rod 42 is provided with adjustable tappets 46, 47. Between the tappets 46, 47, on the slide valve rod 42, I mount a slide 48 which is connected to the compressor piston rod 19 as follows:— A clamp 49 is secured on the piston rod 19 at a predetermined distance from the cylinder head 2. This clamp 49 is provided with a depending bolt 50 which has a sleeve 51 pivoted thereon, which sleeve is held on the bolt by means of a suitable nut 52. A rocking lever 53 is pivoted by means of a bolt 54 to a clamp 55 secured to one of the pipes 56 which connect the compressor cylinder with the engine. The free end of this lever 53 has a loose sliding engagement with the sleeve 51 so that as the piston rod reciprocates the lever 53 is rocked. A link rod 57 connects slide 48 with the rocking lever 53 whereby movement is imparted to the slide 48 from the piston rod through the said rocking lever. The tappets 46 and 47 are so adjusted on the slide valve rod 42 that the slide 48 will engage the tappets as it nears the limits of its movement in both directions and slide the valve 41 the required distance. The fluid supply controlling valve chest 33 may be provided with the usual gage pipe 58 and oil supply pipe 59 which are, in the present instance, located in the removable cover 60 of the chest. The controlling valve rod 42 may also be passed through suitable packed bearings 61, 62, in the ends of the valve chest.

The operation of the device is as follows:— The inlet valves are positively opened and closed and the discharge valves positively closed by pressure from the air chest and the discharge valves are positively opened by direct pressure from the cylinder and auxiliary pressure, as follows:—Supposing the compressor to be in the position shown in Fig. 4 and traveling toward the compressor head 2, the inlet valves 4 will be closed and the discharge valves 5 will be open. The spring 43 in the meantime has moved the slide valve 41 in the air chest to an intermediate position with the pipes 37, 38, both closed to the pressure within the air chest and open to the outlet pipe 40. As the compressor piston approaches the limit of its movement toward the head 2, the piston rod will rock the lever 53 in a direction to cause the connecting link 57 to move the slide 48 along the valve rod 42 into engagement with the tappet 46. The further movement of the compressor piston in this direction will cause the slide 48, because of its engagement with the tappet 46, to move the slide valve 41 into position to open communication from the interior of the air chest 33 to the pipe 38 and the pipe 37 into full communication with the outlet pipe 40. This movement of the valve 41 permits the pressure fluid to pass down through the passage 24 in the six-way fitting 20 and from thence through the horizontal passage 22 and the main and branch pipes 27 to the fronts of the inlet and discharge valve motor pistons 11 and 14 at the compressor head 2. At the same time, pressure is released from the backs of the inlet valve motor pistons at the compressor head 2 through the main and branch pipes 29, the vertical passage 23 in the six-way fitting, the pipe 37 and outlet pipe 40. At the same time pressure is released from the backs of the discharge valve motor pistons 14 at the compressor head 2 through the main and branch pipes 31 to the compressor piston chamber back of the piston 18. This operation will cause the valve motors at the compressor head 2 to promptly close the discharge valves 5 and open the inlet valve 4.

As the above described operation is being performed at the compressor head 2 the following operation is being performed at the compressor head 3. The fluid pressure from the pipe 38 also passes through the main and branch pipes 30 to the backs of the inlet valve pistons at the compressor head 3. The main and branch pipes 28 which communicate with the fronts of the inlet and discharge valve motor pistons at the compressor head 3 are also brought into open communication with the outlet pipe 40 through the horizontal passage 21 and vertical passage 23 in the six-way fitting 20 and the pipe 37. It will thus be seen that the inlet valves at the end 3 of the compressor will also be promptly closed. As the compressor 18 starts toward the compressor head 3 the slide 48 on the valve rod 42 will move with the compressor piston rod 19. This will permit the double acting spring 43 to move the valve 41 into the intermediate position shown in Fig. 6, thus opening both pipes 37, 38, to the outlet pipe 40 and releasing the pressure on the valves. As the compressor piston 18 continues its movement toward the compressor head 3 the discharge valves at the head 3 will be promptly opened, the moment the pressure in the cylinder reaches the pressure in the discharge spaces back of the valves for the reason that the pressure required to overcome the weight of the valves is fed through the main and branch pipes 32 to the backs of the motor pistons of the discharge valves. As the compressor piston 18 nears the compressor head 3 it will be seen that the pressure is released from the backs of the discharge valve motor pistons at the head 3 the moment the compressor piston opens the mouth of the pipe 32 to the interior of the compressor piston chamber.

While I have described this device in connection with an air compressor, it is to be understood that it may be equally well employed in connection with compressors for other gaseous or other aeriform bodies.

What I claim is:—

1. In a compressor, an inlet valve, a single fluid pressure motor therefor, a discharge valve, a single fluid pressure motor therefor, means for controlling the admission of fluid pressure to the motors for positively opening and closing the inlet valve and positively closing the discharge valve, said discharge valve being positively opened by direct pressure from the compressor piston chamber and auxiliary means for controlling the admission of pressure to the said discharge valve motor for assisting in the opening of the discharge valve at a predetermined point in the movement of the compressor piston.

2. In a compressor, an inlet valve, a single fluid pressure motor therefor, a discharge valve, a single fluid pressure motor therefor, a separate source of fluid pressure supply, a valve common to the motors for controlling the admission and exhaust of fluid pressure for positively opening and closing the inlet valve and positively closing the discharge valve, said discharge valve being positively opened by direct pressure from the compressor piston chamber, and auxiliary means for admitting fluid pressure from the said compressor piston chamber to the discharge valve motor for assisting in the opening of the said valve.

3. In a double acting compressor, inlet and discharge valves at each end of the compressor cylinder, a single fluid pressure motor for each valve having its piston connected to the valve stem, a fluid supply controlling valve chest, pipes connecting the valve chest with the motor cylinders to the front and rear of the inlet valve pistons and to the front of the discharge valve pistons, a valve in the chest for controlling the admission and exhaust of the fluid pressure through the said pipes to positively open and close the inlet valves and positively close the discharge valves, said discharge valves being positively opened by direct pressure from within the compressor piston chamber and pipes leading from the compressor piston chamber to the backs of the discharge valve pistons for assisting in the opening of the discharge valves at predetermined intervals.

4. In a double acting compressor, inlet and discharge valves at each end of the compressor cylinder, fluid pressure motors for the inlet and discharge valves, a six-way fitting, pipes leading therefrom to the motor cylinders in front and back of the inlet valve pistons and in front of the discharge valve pistons, a fluid supply controlling valve chest connected to the six-way fitting and having an inlet and outlet and a valve for controlling the admission and exhaust of the fluid pressure for positively opening and closing the inlet valves and positively closing the discharge valves at predetermined intervals.

5. In a double acting compressor, inlet and discharge valves at each end of the compressor cylinder, fluid pressure motors for the inlet and discharge valves, a six-way fitting, pipes leading therefrom to the motor cylinders in front and back of the inlet valve pistons and in front of the discharge valve pistons, a fluid supply controlling valve chest connected to the six-way fitting and having an inlet and outlet and a valve for controlling the admission and exhaust of the fluid pressure for positively opening and closing the inlet valves and positively closing the discharge valves at predetermined intervals and pipes leading from the compressor cylinder to the backs of the discharge valve pistons for assisting in the opening of the discharge valves at predetermined intervals.

In testimony, that I claim the foregoing as my invention, I have signed my name in presence of two witnesses, this sixth day of March 1905.

WILLIAM PRELLWITZ.

Witnesses:
  FREDK. HAYNES,
  HENRY THIEME.